Nov. 17, 1942.  J. F. KUPRION  2,302,331
PHOTO-FINISH DEVICE
Filed April 25, 1941  2 Sheets-Sheet 1

Inventor
John F. Kuprion
By Clarence A. O'Brien
Attorney

Nov. 17, 1942.  J. F. KUPRION  2,302,331
PHOTO-FINISH DEVICE
Filed April 25, 1941  2 Sheets-Sheet 2
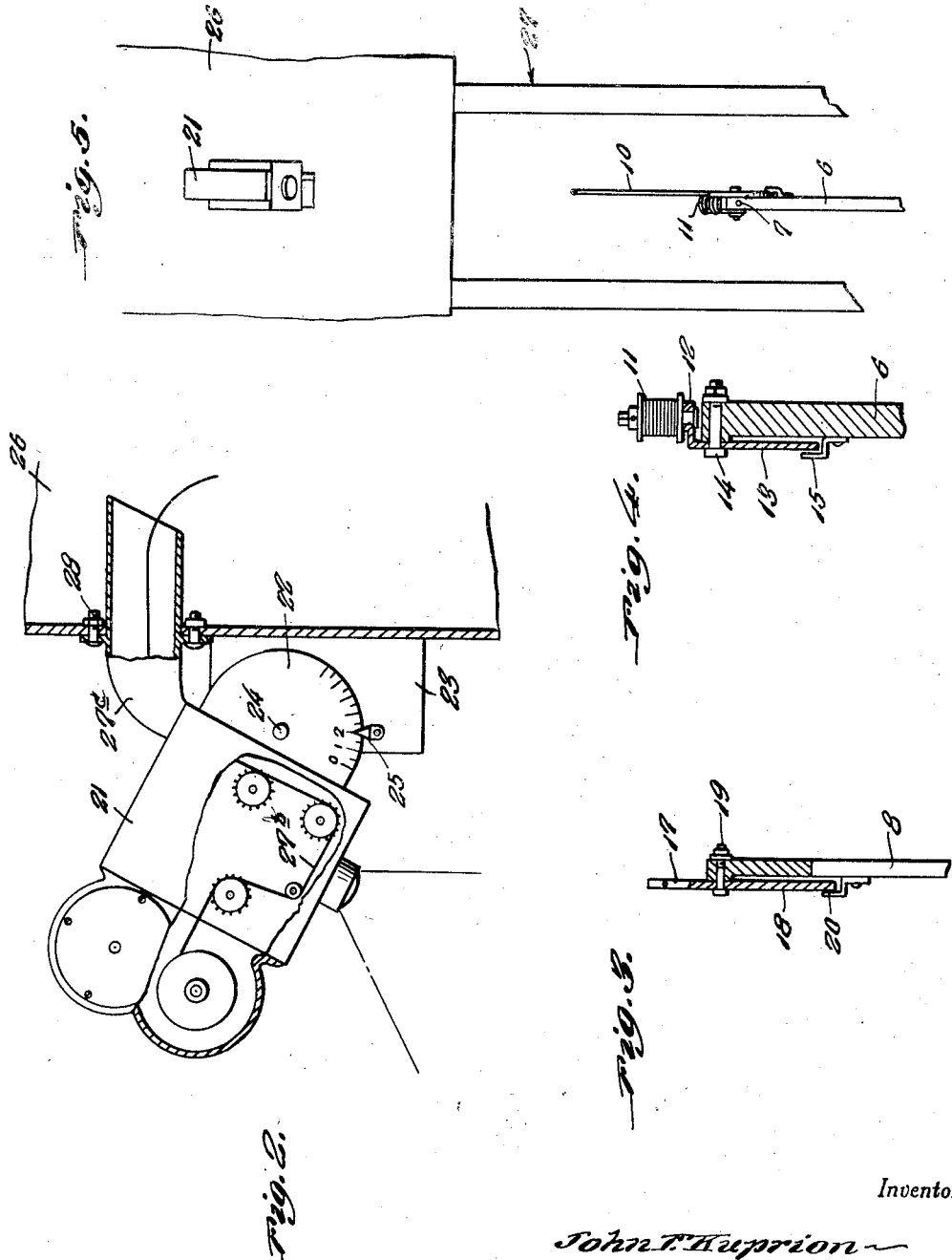
Inventor
John F. Kuprion
By Clarence A. O'Brien
Attorney Patented Nov. 17, 1942

2,302,331

UNITED STATES PATENT OFFICE 2,302,331

PHOTOFINISH DEVICE

John F. Kuprion, Louisville, Ky., assignor of one-half to Allison G. Monroe, Louisville, Ky.

Application April 25, 1941, Serial No. 390,399

5 Claims. (Cl. 95—11)

This invention relates to, broadly, photographic processes, and more particularly has as its object the making possible to photograph accurately the exact order of finish of horses or other animals engaged in a race, that is to say to photograph accurately the exact order of the animals in crossing the finish line.

Particularly it is the object of the present invention to provide for more rapid developing of the photographic plates used in such circumstance.

The invention together with its objects and advantages will be best understood from a study of the following description taken in connection with the accompanying drawings wherein:

Figure 2 is an enlarged detail view of a camera and a portion of a dark room further illustrating the invention.

Figure 1:
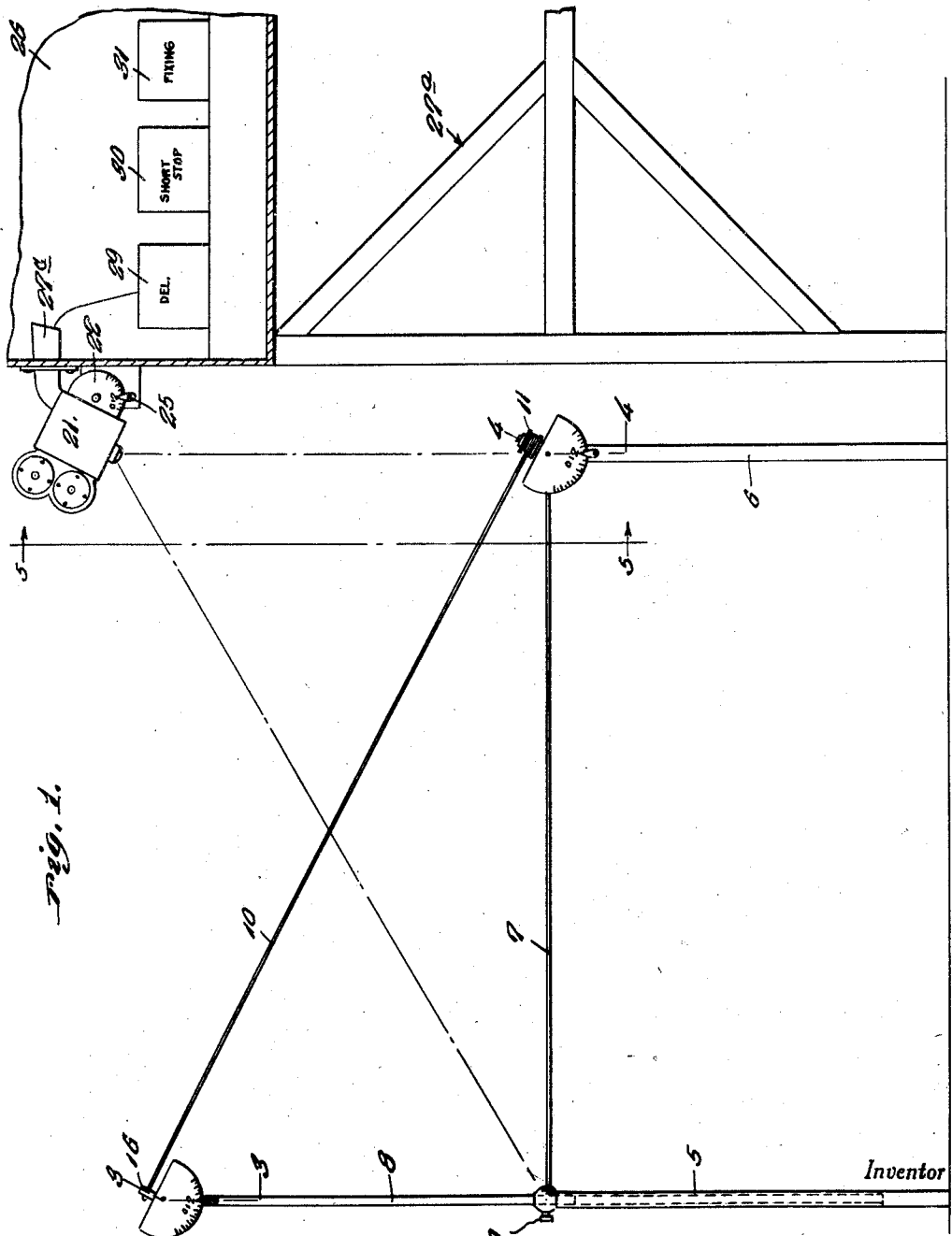
Figure 1 is a view somewhat diagrammatically illustrating the application of the invention.

Figures 3, 4 and 5 are detail views taken substantially on the lines 3—3, 4—4 and 5—5, respectively, of Figure 1.

Referring more in detail to the drawings it will be seen that the reference numerals 5 and 6 indicate respectively the posts on the opposite sides of the race track or course, and which support the finish wire 7. In the present instance the post 5 has telescopically fitting therein a post extension 8 that it secured at the desired position of adjustment through the medium of a set screw or the like 9.

In accordance with the present invention there is provided an adjustable finishing wire 10 that at one end is wound on a spool carried by the arm 12 of a graduated plate 13, the plate 13 having thereon a scale graduated in terms of degrees. The plate 13 is pivoted to the post 6 at the upper end of the latter through the medium of a bolt 14 as best shown in Figure 4, and also mounted on the post 6 is a suitable index 15 to be read against the graduations on the scale plate 13.

One end of the wire 10 is anchored as at 16 to an arm 17 and a similar graduated scale plate 18 that is pivoted to the upper end of the post extension 8 as at 19 and as best shown in Figure 3.

Post extension 8 also has suitably mounted thereon an index 20 against which the graduations on the scale 18 are read.

Obviously by swinging the scale plates 13 and 18 incidental to the adjustment of the post 8 the wire 10 will be secured in the desired diagonal position of adjustment relative to the wire 7 and the angle of the wire 10 relative to the wire 7 can be determined by reading the indexes 15 and 20 against the scales of the respective plates 13 and 18.

Also in accordance with the present invention the camera, which is of conventional structure and indicated generally by the reference numeral 21, has on the rear of the housing thereof a similarly graduated scale plate 22 that is pivoted to a suitable support 23 as at 24. Adapted to be read against the graduations on the plate 22 is an index 25 suitably mounted on the support 23 that extends from one wall of a dark room 26 that is mounted at one side of the track in a well-known manner and in elevated position through the medium of a suitable frame-supporting structure shown fragmentarily in Figure 1 and indicated generally by the reference numeral 27a.

Thus by reading the index 25 against the graduations on the scale plate 22, the camera 21 may be adjusted so that the film strip 27b movable therethrough may have the exposed portion thereof in exact parallelism with the wire 10.

By having the film strip 27b moving in parallelism with the wire 10, and the camera lens placed with its axis perpendicular to the plane of that which is the subject of the photographing operation, namely the finishing plane of the animals in the race, convergence at both ends of the wire is obviated. The plane may be determined by superposing, in photographing—the wire 10 on the post extension 8, it being understood that the latter is exactly vertical, or, by superposing the wire 10 on the wire 7, or, both on the extension and wire 7. Thus by such an adjustment of the wire 10 and the camera 21 an accurate perspective is obtained, the undesirable convergence is obviated and with scientific accuracy the exact finish of the racing animals, in the order of their finish, will be photographed.

Also in accordance with the present invention there is provided a tube 27c that extends from the film outlet side of the camera case 21 through an opening provided therefor in the wall of the dark room 26 being secured to the wall of said room as at 28 and as clearly shown in Figure 2.

The film as it feeds through the tube 27c passes into the dark room where development thereof takes place.

Also in accordance with the present invention provision is made for rapid development and finishing of the photographic plates. To this end there are provided suitably within the dark room 26, and as shown in Figure 1, a bath 29 which contains a developing solution where development of the successive negatives takes place. From this bath 29 the exposed negatives are passed into a "short-stop" mixing bath 30, and from this bath 30 the negatives are passed into the regular fixing bath 31 thus completing the process of developing and fixing at the same time the exposures are being made.

Thus in accordance with the present invention anywhere from ten to twelve seconds only are required for fixing the film, while some five to ten seconds are required for enlarging, and the entire time for making the exposure to the final development of the pictures for showing the results on the screen for the benefit of the judges is only from approximately thirty to forty-five seconds.

In connection with the above it will also be understood that the camera 21 is slightly modified, certain parts of the winding mechanism being omitted so that the film may pass from the camera through the tube 27c.

It is thought that a clear understanding of the construction, operation, utility and advantages of an invention of this character will be had without a more detailed description thereof.

Having thus described the invention what is claimed as new is:

1. In an apparatus for photographing the finish of horse races and the like, and in combination with the finish wire and supporting posts therefor, one of said posts having a post extension vertically adjustable relative thereto and equipped with means for securing said post extension at the desired position of vertical adjustment; a graduated scale plate pivotally mounted on the other of the finish posts and on the upper end of said post extension respectively, indexes on said other finish post and said post extension adapted to be read against the graduations on the respective scale plates, a spool mounted on the first-named scale plate, a supplemental finish wire windable on said spool and having an end secured to the scale plate on said post extension whereby said supplemental finish wire may be supported at the desired angle, vertically, with respect to the regular finish wire, a camera pivotally mounted on a fixed support above said supplemental wire and equipped with a scale plate graduated in terms identical with the terms of graduation on the first-named scale plates, an index against which the graduations of the camera-carried scale plate are read whereby said camera may be adjusted to place the axis of the lens thereof and perpendicular to the supplemental finish wire, and means associated with said camera and guiding the film as exposure takes place out of the camera into a dark room.

2. In an apparatus for photographing the finish of horse races and the like, and in combination with the finish wire and supporting posts therefor, one of said posts having a post extension vertically adjustable relative thereto and equipped with means for securing said post extension at the desired position of vertical adjustment; a graduated scale plate pivotally mounted on the other of the finish posts and on the upper end of said post extension respectively, indexes on said other finish post and said post extension adapted to be read against the graduations on the respective scale plates, a spool mounted on the first-named scale plate, a supplemental finish wire windable on said spool and having an end secured to the scale plate on said post extension whereby said supplemental finish wire may be supported at the desired angle, vertically, with respect to the regular finish wire, a film camera pivotally mounted on a fixed support above said supplemental wire and equipped with a scale plate graduated in terms identical with the terms of graduation on the first-named scale plates, an index against which the graduations of the camera-carried scale plate are read whereby said camera may be adjusted to place the film thereof in substantial parallelism with the supplemental finish wire, and means associated with said camera for guiding the film as exposure takes place out of the camera.

3. In an apparatus for photographing the finish of a race, and in combination, a finish line extended across the track and parallel to the surface thereof, an auxiliary line supported above the finish line, and means for supporting said auxiliary line in substantially the same vertical plane as the finish line and a predetermined position of adjustment at an angle to the vertical, and photographic means located to one side of the track and embodying a pivotally mounted camera adapted to be adjusted for placing the lens thereof with its axis perpendicular to said auxiliary line.

4. In an apparatus for photographing the finish of a race, and in combination, a finish line extended across the track and parallel to the surface thereof, an auxiliary line supported above the finish line, and means for supporting said auxiliary line in substantially the same vertical plane as the finish line and at a predetermined position of adjustment at an angle to the vertical, and photographic means located to one side of the track and embodying a pivotally mounted camera adapted to be adjusted for placing the lens thereof in parallelism with said auxiliary line, the supporting means for said auxiliary line and the supporting means for said camera respectively embodying a scale plate and an index fixed relative to the scale plate to be read against the graduations thereon to insure accurate adjustment of said auxiliary line and said camera respectively.

5. In an apparatus for photographing the finish of a race, a finish line extending across the race course parallel to the surface thereof, photographic means located to one side of and above said line and embodying a film camera and a supplemental finish wire stretched across said track intermediate the first wire and camera in a common vertical plane therewith and diagonally of the first wire, said camera and supplemental wire being relatively adjustable to vary the angle of the supplemental wire and adjust the camera to place the axis of the lens thereof perpendicular to the common plane.

JOHN F. KUPRION.